Figure 16:
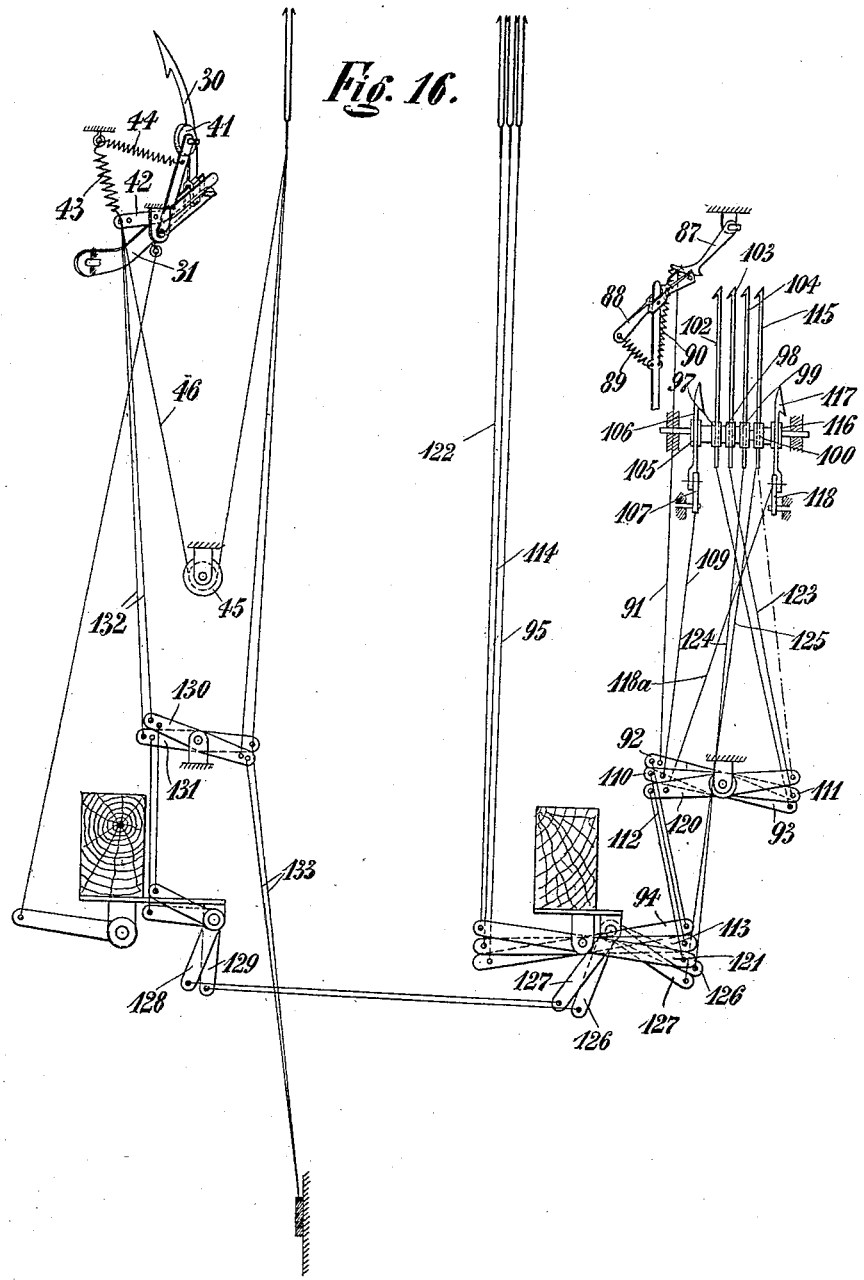

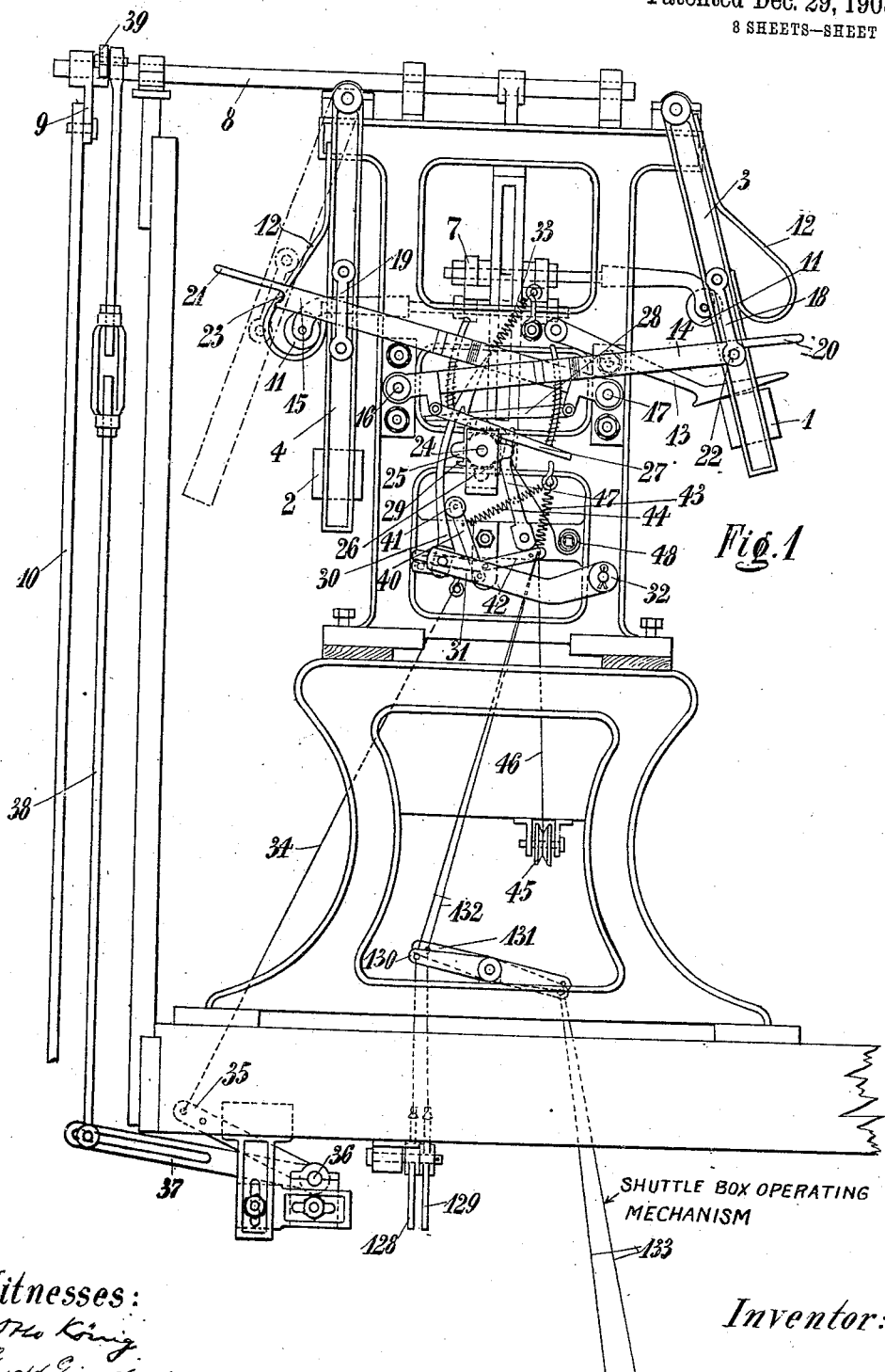

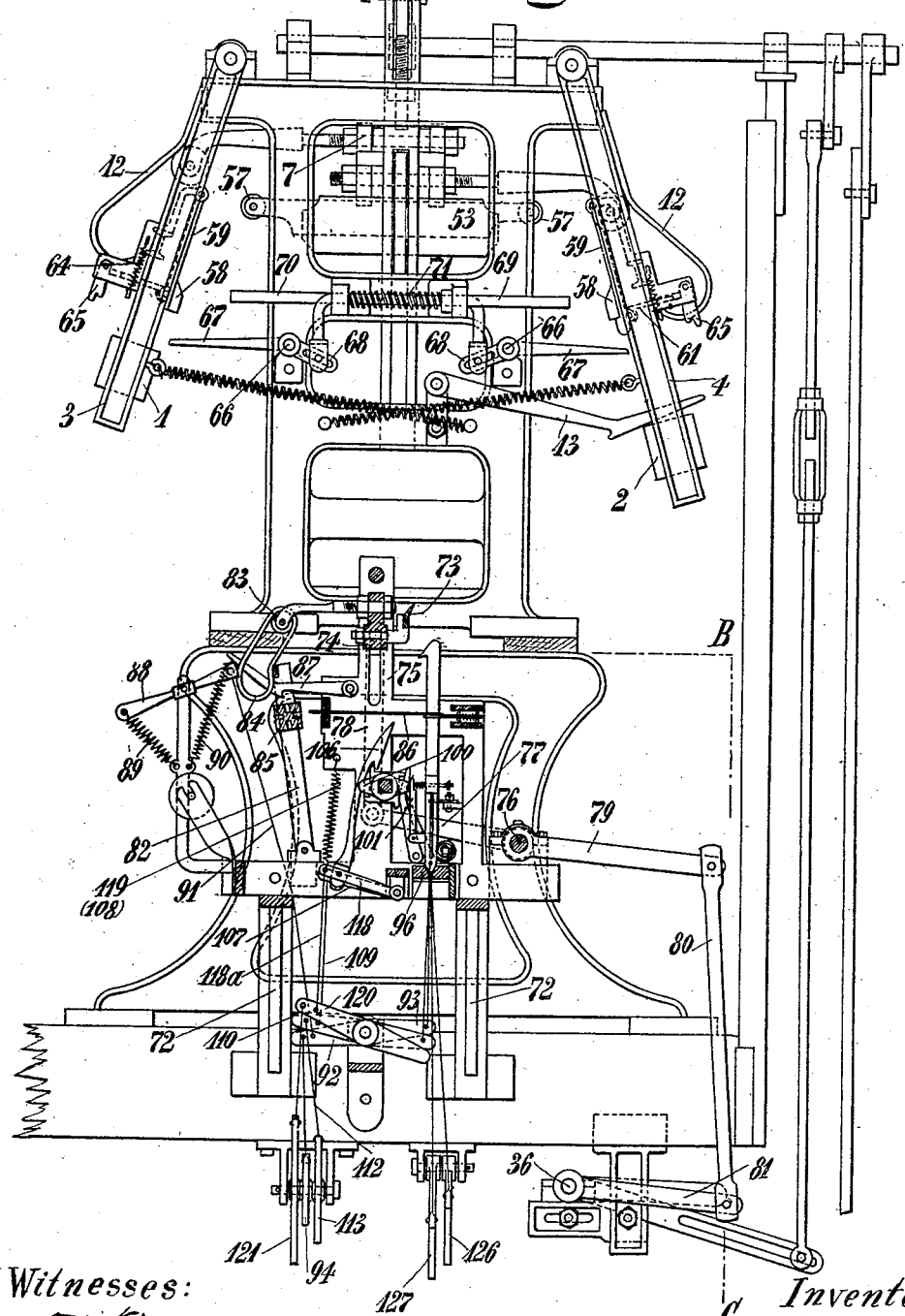

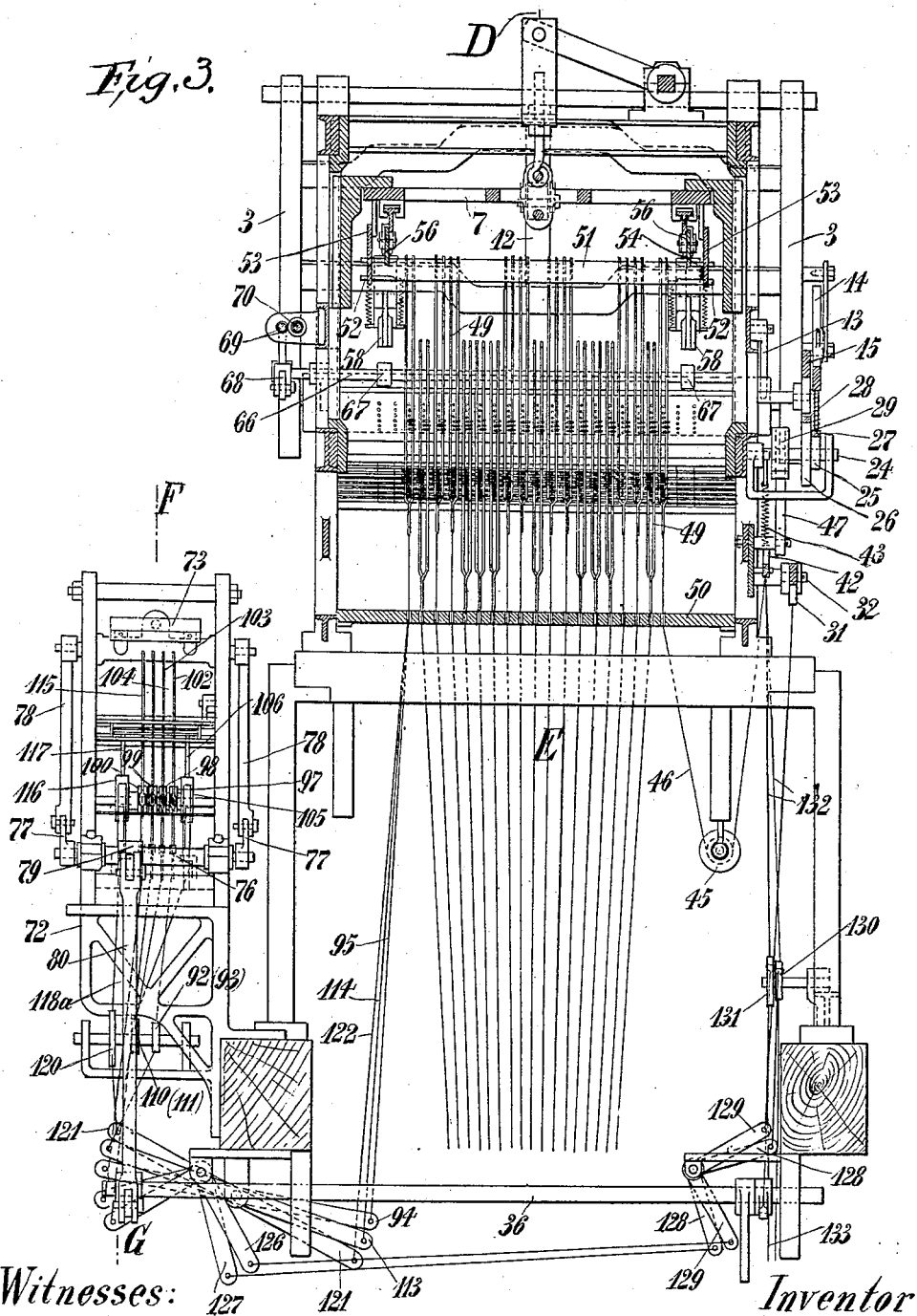

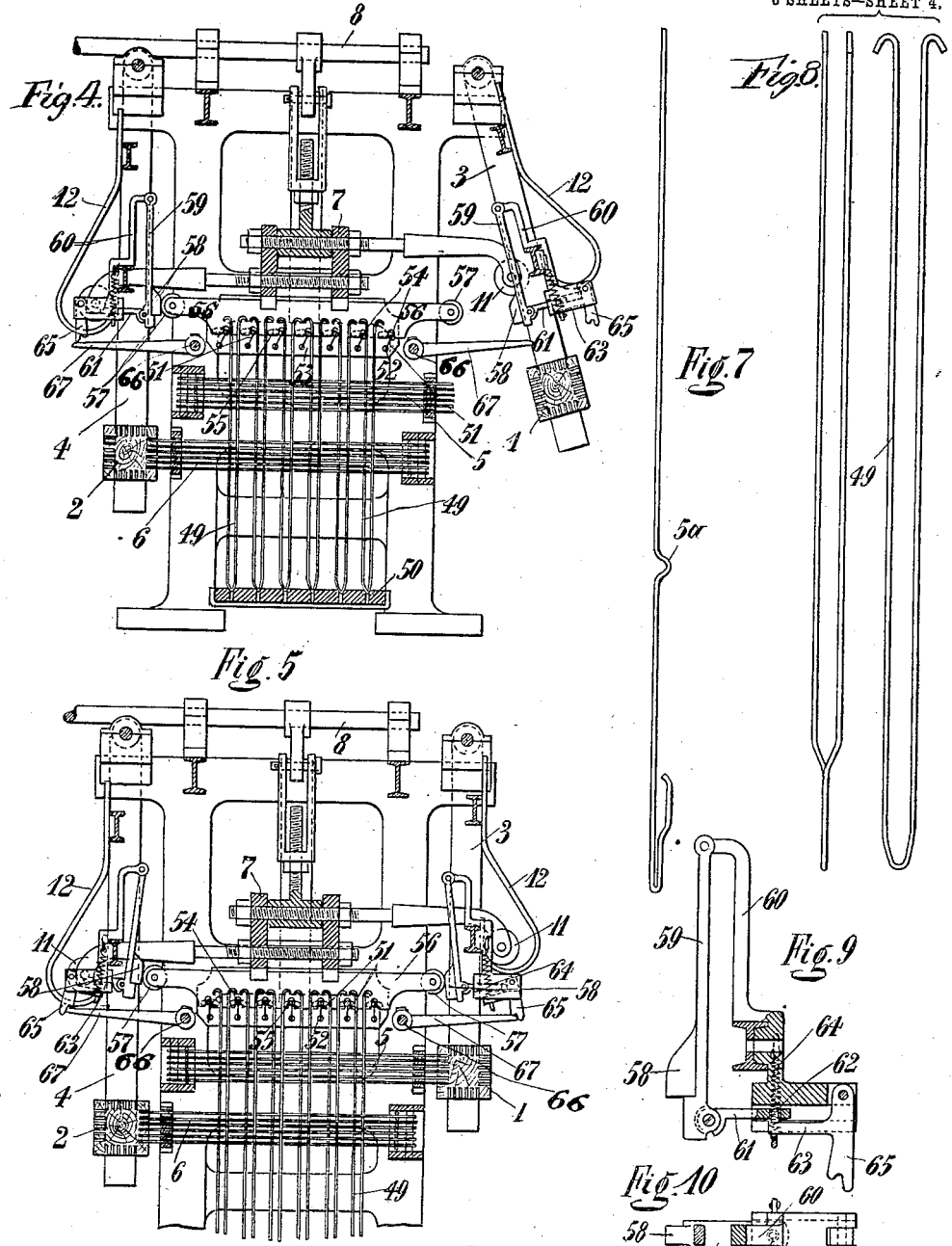

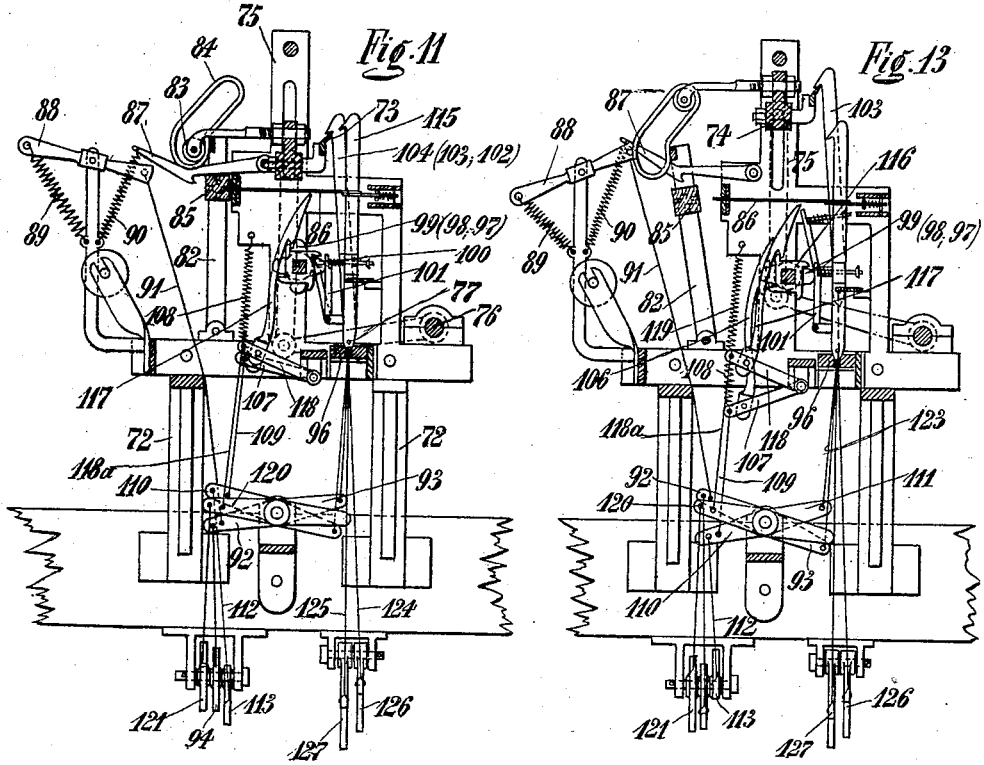
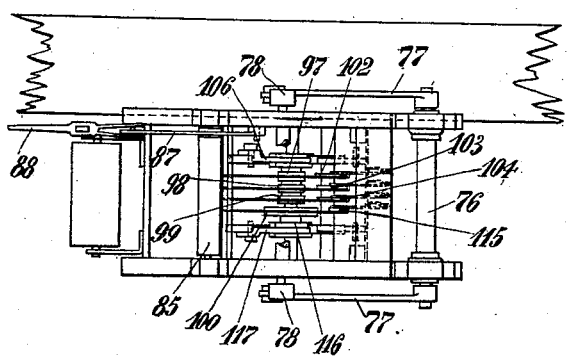

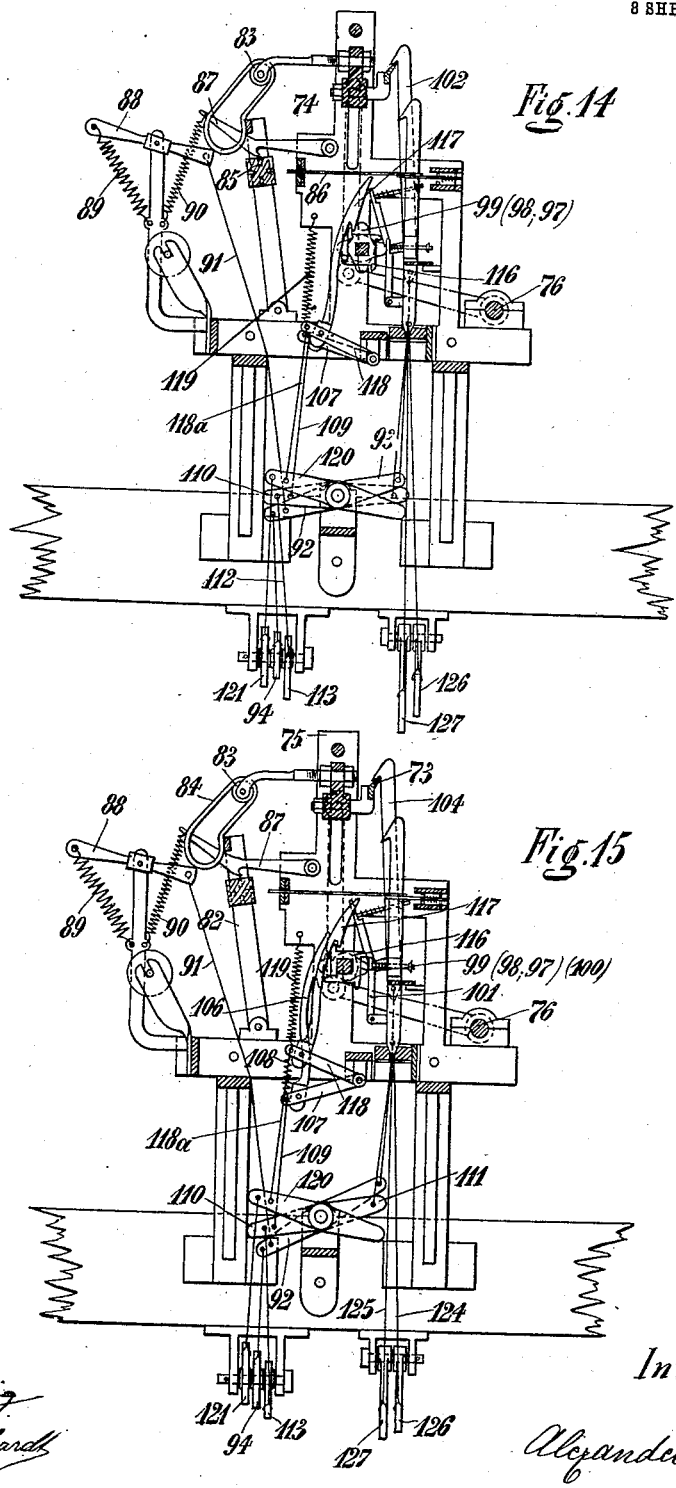

A. AMBRUS.
JACQUARD MACHINE.
APPLICATION FILED NOV. 15, 1906.

908,191.

Patented Dec. 29, 1908.
8 SHEETS—SHEET 7.

Witnesses:

Inventor.
Alexander Ambrus

UNITED STATES PATENT OFFICE.

ALEXANDER AMBRUS, OF BARMEN, GERMANY, ASSIGNOR OF ONE-HALF TO HEINRICH ROSENBAUM, OF BARMEN, GERMANY.

JACQUARD-MACHINE.

No. 908,191.

Specification of Letters Patent.

Patented Dec. 29, 1908.

Application filed November 15, 1906. Serial No. 343,533.

*To all whom it may concern:*

Be it known that I, ALEXANDER AMBRUS, residing at Barmen, in the Province of Rhenish Prussia, Germany, have invented certain new and useful Improvements in Jacquard-Machines; and I do hereby declare the following to be a full, clear, and exact description of the invention, such as will enable others skilled in the art to which it appertains to make and use the same.

The subject matter of the present application is a new jacquard machine which for the purpose of economizing cards is fitted with a separate card-cylinder and card-chain for the ground and with a second card-cylinder and card-chain for forming the design or figure, these cylinders being alternately set in action according to the design to be produced by using an auxiliary apparatus likewise arranged after the manner of a jacquard mechanism.

Machines of a similar kind are it is true already well-known. The present invention is however distinguished from these in the first place by the exceedingly simplified and improved construction of the jacquard machine proper, viz. the main machine, so that it works very much more reliably than those hitherto invented, and in the second place by a materially more perfect arrangement of the auxiliary apparatus controlling the main machine, so that it is possible not only according to requirement to make the ground apparatus corresponding to the ground card chain repeat itself as often as desired but it is also possible to operate the change-over gear and consequently set the figure card-chain-machine in action after even only a few cards of the ground card-chain have come into action. This is particularly of the greatest advantage in the manufacture of fabrics having figures repeated at comparatively long intervals in which case in the ground fabric always a short ground is entirely or even only partially repeated. It is then necessary for only a ground card-chain corresponding to this ground to be employed, which chain can continually be reeled off again by means of the auxiliary apparatus.
Thus the result of the present invention is that the requisite number of cards is reduced to the lowest number possible. Consequently the whole method of working is simplified and in the manufacture of a definite fabric preparatory work is in particular reduced,
because a far smaller number of cards have to be made and to be laced up.

A further important advantage however lies in the ground card chain being simplified and in it being possible to use it again in the majority of cases, so that on producing a woven design it is necessary only to make the figure chain afresh.

Finally when the present improved machine is employed fewer mistakes occur in the weaving as the workman has to superintend only a small fraction of the cards hitherto employed and as the machine works perfectly automatically the attention which has to be given to the machine by the workman in charge of the loom is a matter of no account at all.

The invention will now be described in detail, reference being made to the accompanying drawings, in which:

Figure 1 is a back elevation of the jacquard machine the griff being lowered, Fig. 2 a front elevation of the main machine the griff being raised and the auxiliary apparatus being shown in section, Fig. 3 a vertical section on the line A—B—C of Fig. 2, Fig. 4 a section of the main machine on the line D—E of Fig. 3 the griff however being lowered, Fig. 5 a view like Fig. 4 but with both battens simultaneously performing a forward stroke. Fig. 6 a plan of the arrangement of the lifting hooks, Fig. 7 a view of a needle, and Fig. 8 two elevations of a lifting-hook, one elevation being at right angles to the other, Figs. 9 and 10 a part sectional elevation and a part sectional plan respectively of a detail forming part of the main machine, Fig. 11 a vertical section of the auxiliary apparatus alone on the line F—G of Fig. 3, Fig. 12 a plan of Fig. 11, Figs. 13 to 15 various elevations of the auxiliary apparatus for illustrating the mode of operation, Fig. 16 a diagram of the connections of the auxiliary apparatus with the main machine and with the shuttle, changing device, and finally Fig. 17 a pattern of a design to be woven with reference to which the mode of operation of the invention is explained below.

Referring to the drawings, 1 and 2 are the two card-cylinders, of which for example that designated 1, is for the card-chain determining the design while 2 is for the card-chain giving the ground. The two cylinders are arranged opposite one another in a manner which in itself is well-known and are supported in swing-battens 3, 4 at different heights. Each cylinder acts by means of a separate needle-system 5 or 6 on the hooks or lifting-wires of the machine. The requisite swinging motion which is imparted to the battens 3, 4 is derived from the griff 7. By means of the oscillating shaft 8 to which a suitable reciprocatory motion is imparted by the arm 9 and the rod 10, said griff 7 is reciprocated up and down in proper coöperation with the other parts of the loom and thereby moves the battens through the instrumentality of the rollers 11 which are provided on it and which engage with the curved members 12 situated on the battens. The battens are moved in such a way that on the ascent of the griff the batten operating at the time is swung out, while on the descent of the griff said batten approaches the needle-system and is pressed against the latter in the ordinary manner, the roller 11 sliding into the lower part of the member 12 (Figs. 1 and 4). On the batten swinging out the card-cylinder carried by the same is simultaneously turned by means of the lantern arranged on it and the catch 13 with which it engages, this method of turning the cylinder also being in itself well-known.

Now in order to be able to disengage, switch out, or put out of action first the one and then the other cylinder according to the fabric to be manufactured, the switching-out bars 14, 15 are provided at the back of the machine (see Fig. 1), which are mounted pivotally on the frame at the one end 16 or 17 respectively while their free ends pass through and engage with staples, eyes or the like 18 or 19 respectively provided on the outer sides of the battens. These bars possess at their free ends finger-like extensions 20, 21 and circular recesses 22, 23 under said extensions. If the rods are left to themselves so that they can move under the action of their own weight, they rest with their free ends in the bottoms of the staples 18, 19 and consequently the latter catch in the recesses 22, 23 respectively on the return-stroke of the battens so that said battens are held in the positions they occupy when swung out. These bars 14, 15 are made of such a length that they do not hold the battens in their extreme positions that is, the positions occupied when fully swung out, so that consequently the batten out of action at the time is swung slightly further out when the griff rises and consequently is disengaged for an instant from the recess 22 or 23 of the bar in question so that the latter can then be raised.

Now in order continuously to keep one of the rods out of action so that the corresponding batten can operate, a controlling shaft 24 is provided under these rods upon which shaft are fastened the two double tappets or cams 25, 26 which are set at 90° with regard to one another each of which acts on one of the bars 14, 15 the action being such that when either is in a vertical position it holds up the corresponding rod and consequently prevents the corresponding staple 18 or 19 from engaging in the recess in the corresponding bar so that the corresponding batten can operate without hindrance. On the other hand, however, when either is in a horizontal position, it releases the corresponding rod so that the batten then detains the corresponding batten in its swing-out position. In the example illustrated these double tappets 25, 26 do not act directly on the switching out bars but through the medium of resilient levers 27, 28 which are pivoted at one end on the bars and are connected at their other end with the same by means of compressed springs inserted between said levers and their bars. This special arrangement enables the switching-out mechanism to operate entirely without shock. If the shaft 24 is turned through 90° in order to place in a vertical position first the one and then the other double tappet 25 or 26 in order to switch in or put into gear first the one and then the other card-cylinder, the batten of the cylinders to be set in action is not thereby immediately released but release does not take place until after said batten has been raised out of the recess in the corresponding bar by means of the rising griff. On account of the influence of the resilient levers it is impossible for the batten to fall back. These levers at the same time serve to keep the bar corresponding to the batten working at the time always out of contact with the lower stop forming the lower part of the staple 18 or 19 on the batten, so that the batten can continue to move without hindrance.

In order to enable the shaft 24 to be turned in the requisite manner for the operation described above, a small ratchet wheel 29 provided with four teeth is fixed on said shaft, with which ratchet wheel the pawl 30 coöperates. This pawl 30 is pivoted at its lower end on an arm 31 which is pivotally mounted on the machine frame at 32, while the upper end of the pawl 30 is connected with a spring 33 in tension, which tends to pull the hook upwards and consequently to hold it in such a position that it engages in the ratchet-wheel 29 and that it would turn the latter and consequently also the shaft 24 through 90° if it were pulled downwards against the action of the spring 33. The upper end of a cord 34 engages with the arm 31, which cord is connected at its lower end with the free end of an arm 35 which is fixed on a shaft 36 supported underneath the jacquard machine on the frame of the loom. Said shaft 36 is connected through the arm 37, rod 38 and arm 39 with the shaft 8 for reciprocating the griff, so that it is turned to and fro with said shaft 8 and consequently by means of said cord 34 each time that the griff is raised the pawl 30 is pulled downwards and thereby the shaft 24 would be turned if it were not that the pawl is usually held out of engagement with the ratchet wheel 29. For this purpose the angle lever 40 is pivotally mounted on the frame, which lever rests with the roller 41, which is mounted on the one arm of the lever, against the pawl 30, while the two-armed lever 42 which is likewise pivoted on the frame acts on the other arm of the lever 40. Said lever 42 is on the other hand under the influence of a comparatively powerful spring 43, so that by means of said spring the angle-lever 40 is pressed with its roller 41 against the pawl 30, the result of which is that the latter is held out of engagement with the ratchet-wheel 29. With the roller-arm of the angle-lever 40 another spring 44 engages, which is however considerably weaker than the spring 43 acting on the two-armed lever 42. In consequence of this arrangement the pawl 30 is reciprocated up and down always in correct coöperation with the other parts of the machine by means of the action of the pulling-device or cord 34 actuated from the shaft 36, but as a rule this motion produces no effect, that is no change-over in the gearing of the machine is thereby effected. On the other hand this is not effected until the action of the spring 43 is counteracted by a pull on the lever 42 on which said spring acts. On the action of the spring 43 being thus counteracted, the spring 44 which up to that time could not act pulls back the angle-lever 40 away from the pawl 30, so that the latter on moving downwards engages in the ratchet-wheel 29 and consequently turns the shaft 24 through 90° for the purpose of changing the gear of the machine. The pull on the two-armed lever 42 for doing away with the influence of the spring 43 and consequently for changing the gear of the machine can be produced by the operator by hand. In the example illustrated however, the pull is produced by a heddle 46 of the jacquard machine itself guided over the pulley 45 or by the auxiliary apparatus in the manner subsequently to be described. The gear-shifting mechanism may, however, be effected by the jacquard mechanism or the auxiliary devices indirectly, instead of directly as shown.

By my construction and combination of parts the several parts of the jacquard mechanism and of the auxiliary apparatus are prevented from wearing out prematurely.

The shaft 24 is prevented from turning of its own accord by means of a lever 47 mounted on the frame, the free end of which is pressed by the action of the spring 48 against the ratchet wheel 29.

Instead of being supported in swing-battens the card-cylinders might for example in the case of the larger sizes of machines be arranged in slide-battens, in which case the disengaging-bars are suitably provided at both ends of the cylinders and are formed as angle-levers.

The lifting hooks 49 consist of bent U-shaped pieces of wire and are so arranged on the bottom board 50 of the jacquard machine that the two shanks are situated one behind the other looking in the direction of the axes of the needles the two shanks are however at a short distance from their lower ends bent the one to the left and the other to the right so that there is room for the needles between said lifting-hook shanks. The needles of the one system 5 act for example on the left shanks and the needles of the other system 6 on the right shanks of the lifting-hooks and clasp their respective shanks by means of a bend or half loop (5ª Fig. 6) which passes round at the outer sides of the shanks. They consequently do not possess closed eyes, as is customary. In spite of this however the certain coöperation of the parts is insured by the needles lying between the shanks of the hooks standing out of engagement with said needles whereby both the hooks and the needles are at the same time securely retained in their correct positions. Moreover the arrangement of the hooks and needles as above described and already illustrated in Fig. 6 is such that said hooks and needles occupy a minimum amount of space.

At their upper ends the shanks of the lifting-hooks are provided with downwardly bent hooked portions the hooked portions of the two shanks of one lifting-hook being turned outwards in opposite directions. Between each pair of the lifting hooks which are arranged in series one behind the other, and at the outside of the first and last of said lifting-hooks a pivoted lifting-blade 51 forming part of the griff is provided, so that the griff contains one more blade than the number of lifting-hooks forming one series the members of which are arranged one behind the other, and consequently according to the position of the blades either the first or the last of the same is unable to perform work. At both ends each of the blades (see Fig. 3) possesses above and below a round pivot and the blades are revolubly supported by means of the lower pivot 52 in plates 53 fixed in the griff, while by means of their upper pivots 54 they are guided in arc-shaped slots 55, Fig. 4, in the said plates 53, which slots so limit the movement of the blades when being turned that the two limiting positions are exactly those required for the necessary working positions. In order to turn the blades, bars 56 (Fig. 3) are employed which are arranged in a well-known manner displaceably in the griff and which engage by means of recesses with the upper pivots 54 so that when said bars are shifted, they move the blades with them and turn them about the lower pivots 52. These bars 56 are according to the present invention moved in the requisite manner by means of rollers 57 which they carry at both ends and which reach into the path of motion of wedge-shaped noses 58 provided on the battens, so that, when the griff descends and consequently simultaneously drives the batten working at the time towards the corresponding set of needles, these noses 58 cause the blades to turn by acting on the bars 56 of the griff, this action not taking place until the blades leave the lifting-hooks, that is, not until the blades are completely free from said hooks. Consequently according to the present invention the batten operating at the time itself brings the lifting-blades into their correct position and insures their remaining in this position until they have engaged the lifting-hooks which have not been pushed aside, so that it is impossible for error in the operation of the lifting-blades to occur.

In order to prevent the griff from being damaged in case the change-over gear of the machine gets out of order for any reason and causes both card-cylinder battens to strike, each batten of the machine is provided with a safety-device acting after the manner of the well-known trigger-mechanism. Namely, the noses 58 which cause the blades to turn, are not fixed rigidly on the swing-battens but each of them is arranged at the lower end of a carrying arm 59 (see Figs. 9 and 10) which is pivoted at its upper end on a holder 60 fastened on the batten, while at its lower end a pivoted slide-piece 61 is mounted which is situated approximately at right angles to the carrying arm 59 and which engages with its free end in a guide-slot suitably provided in the holder 60. The free end of said slide-piece is provided with a hole 62. In said hole engages a detent 63 which is formed like an angle-lever, the engagement being effected by means of a nose or projection provided on one of the arms of the detent. Springs 64 tend to keep both parts in engagement, that is, said projection in the hole in the slide-piece. Consequently the noses 58 are held firmly on with regard to the battens as long as the detents 63 remain in engagement with their corresponding slide-piece 61, and said noses consequently effect the turning of the pivoted blades in the above described manner (see Fig. 4). If however the detents are released from the slide-piece 61, the noses 58 on the forward stroke of the battens are pressed back by the rollers 57 on the griff and consequently produce no effect on the blades. A trigger mechanism is employed to release the detents 63, said mechanism coöperating with the downwardly directed arms 65 of said detents. At each side of the machine a horizontal shaft 66 is supported in the machine-frame. Said shafts carry the triggers 67 (Figs. 2, 4 and 5) opposite said detent-arms 65, and at their front ends that is, at the ends farthest away from the change-over gear of the machine, they are connected (see Figs. 2 and 3) through arms 68 with slide-rods 69, 70 mounted on the frame so as to be capable of reciprocating in a horizontal direction. Said slide-rods are subjected to the influence of springs 71 which tend to push them towards the opposite side of the machine to that on which the corresponding arm 68 is mounted, so that their ends project beyond the machine-frame and reach into the path of the battens 3, 4. The batten operating at the time consequently at each forward stroke displaces the slide-rod 69 or 70 projecting at the side in question and therefore turns the trigger-shaft 66 situated at the other side, so that the triggers fastened on said shaft are raised. Finally said triggers are so arranged that while in their position of rest they exercise no action on the detent-arms 65 mentioned above, but release these detents during the forward stroke of the batten as soon as the triggers are raised at the side in question.

As will be readily understood from the above detailed description, the safety-device described exercises no action as long as the machine is running in working order, that is, as long as one or other of the battens is held in the swung-out position. For example suppose that in Fig. 4 the left batten is operating while the right one is disengaged or switched out of gear. In this case the right-hand triggers are raised during each forward stroke of the left-hand batten. This however produces no effect because the right-hand batten is not executing a forward stroke and consequently the detents 63, 65 do not come into contact with the raised triggers. On the left-hand side of the machine, however, the triggers are not raised at all. If however, as is supposed to be the case in Fig. 5 both battens execute forward strokes, the detents at both sides are raised and therefore the detents 63, on both battens are released, so that when the noses 58 on both battens strike against the rollers 57 said noses can yield backwards and so it is impossible for injury to be done to the griff even if the loom continues to work as the detents 63 must be re-set by hand before the noses 58 can be held in their operative position again.

The changing-over of the gear of the above described main machine besides being effected by means of a heald on said machine itself is according to the present invention effected by means of a special auxiliary apparatus which, as mentioned above, is itself constructed after the manner of a jacquard-machine. Said auxiliary apparatus in the example illustrated is mounted on brackets 72 secured on the front of the loom-frame. 73 is the lifting-blade of this auxiliary apparatus. The same is mounted on a holder 74 which is guided in the frame 75 so as to be capable of reciprocating up and down and is actuated from the shaft 76 through the medium of the arms 77 fixed on the same and connecting-rods 78, said rock shaft 76 having such movements through a portion of a revolution imparted to it through the medium of the arms 79, rod 80 and arm 81 from the above-mentioned shaft 36 operated from the main machine, that the lifting-blade of the auxiliary apparatus always moves in the same manner as the griff of the main machine. The batten 82 of the apparatus which is arranged standing approximately upright is set swinging in the requisite manner by means of the griff or lifting-blade holder 74 through the instrumentality of the roller 83 provided on said holder and of the loop 84 mounted on the batten and coöperating with said roller, so that the cylinder 85 carrying a special chain of small cards and revolubly supported in said batten is, when the lifting blade 73 is in its lowermost position pressed against the needles 86 which engage the hooks and which are subjected to the action of springs in the ordinary manner. The cylinder 85 is fitted with a lantern in the customary manner with which the catch 87 coöperates so that the cylinder is turned each time that the batten swings to and fro and thereby another small card is brought on to the operative face of the cylinder unless the catch 87 is held out of action by means of the lever 88 pivotally supported on the frame. This lever 88 engages with its one arm under the catch and is on the other hand so acted upon by a spring 89 that the catch 87 is as a rule held out of engagement with the lantern of the cylinder 85. A spring 90 which is however weaker than the spring 89 and which engages with the catch itself tends on the other hand to hold the catch in engagement with the cylinder-lantern. The lever 88 is connected by means of a cord 91 with the one arm of a two-armed lever 92 pivotally mounted on the loom-frame between the brackets 72 and this lever-arm 93 is for its part connected with the one arm of another two-armed lever 94 supported underneath the loom-frame, with the other arm of which lever 94 a heald 95 from the main machine engages, so that the lever 88 is put out of action by said heddle, the result of which is that the catch 87 can be set in action.

The lifting hooks of the auxiliary apparatus (in the example illustrated the same possesses four of them) stand in the ordinary manner in their position of rest on the bottom board 96 and are guided above in eyes on the needles 86. Moreover each lifting-hook rests with a small resilient arm 101 against one of the double cams 97—100, each of said arms being pivoted at one end on one of the lifting-hooks and resting at the other end against a spring. Said double-cams 97—100 are arranged on a shaft mounted on the frame so that when horizontal they keep the lifting-hooks out of the reach of a lifting-blade so that in this case the lifting-hooks are inactive. If however the one or the other of the double cams is placed vertically, the spring acting on the corresponding arm 101 is released from stress and the corresponding lifting-hook is pressed by the weaker spring acting on its needle into the reach of the lifting-blade so that said lifting-hook is raised by the latter unless the needle is pressed back by the card on the operative face of the cylinder 85. The cams 97, 98, 99 of the three first lifting-wires 102, 103, 104 always act in the same manner, that is, they always take up the same position, so that they may consist of a single piece as shown in the drawings and they may be set by means of a common controlling-gear. The latter consists of a small ratchet-wheel 105 provided with four teeth and of the corresponding pawl 106 which is pivoted on a lever 107 pivotally mounted on the frame and which is held up and in engagement with the ratchet-wheel 105 by a spring 108. The lever 107 is connected by means of a string 109 with the one arm of the lever 110, 111 mounted pivotally with the above-mentioned lever 92, 93 on a common pivot or pin, and said lever 110, 111 is again connected by means of a cord 112 with the one arm of a lever 113 pivoted with the lever 94 about a common pivot, a heddle 114 on the main machine acting on the other arm of said lever 113, so that when this heddle is actuated the double cams 97, 98, 99 are turned through 90° at a time and so are set alternately perpendicularly and horizontally, the result of which is that the lifting-hooks are in the former case able to act and in the latter case held out of action.

The double-cam 100 appertaining to the fourth lifting hook 115 is independent of the others and is consequently provided with a special controlling-gear. The latter consists likewise of a ratchet-wheel 116 provided with four teeth and connected rigidly with the cam and of the pawl 117 coöperating with said ratchet-wheel 116, which pawl is pivoted on a lever 118 mounted with the above-mentioned lever 107 on a common pivot or pin and is continually subjected to the upward tension of the spring 119 and is thereby held in engagement with its ratchet-wheel 116. The lever 118 is connected by means of a cord 118ª with a lever 120 pivoted together with the levers 92, 93 and 110, 111 about a common pivot or pin, and said lever 120 is again connected with the one arm of a lever 121 supported on the loom-frame, on which lever 121 a heddle 122 on the main machine acts so that consequently the double-cam 100 can be set by said heddle according to requirement.

Of the lifting-hooks the one designated 102 is connected with the arm 93 of the lever 92, 93 already above-mentioned, the other arm 92 of which is joined by the cord 91 with the lever 88 so that the card-cylinder can be turned not only by the instrumentality of the main-machine but also by raising the first lifting-hook. The second lifting-hook 103 is connected by means of a cord 123 with the second arm 111 of the lever 110, 111 already mentioned above, so that this lifting-hook 103 on being raised likewise turns the three connected double-cams 97, 98, 99. The third and fourth lifting-hooks 104 and 115 finally are connected by cords 124, 125 each with one of the two angle-levers 126, 127 mounted on the loom-frame. The latter again are joined by cords each with one of the two angle-levers 128, 129 (Figs. 1, 3 and 16) mounted suitably at the back of the loom on its frame, and these angle-levers 128, 129 again are connected by cords with the two-armed levers 130, 131, one arm of each of which is connected by one of the cords 132 with the above-mentioned two-armed lever 42 for operating the change-over gear of the main machine, while the other arms of levers have cords 133 attached to them as shown in Fig. 1, these cords being designed to make connection with change mechanism for the shuttle-boxes (not shown). The parts or elements in combination are arranged so that each actuation of lifting hook 104 or 115 sets another card cylinder in action and also simultaneously shifts the change box bringing another shuttle to the level of the shed.

It may here be remarked that the arrangement described and illustrated is intended for the manufacture of goods having one or more kinds of weft.

Figure 17:
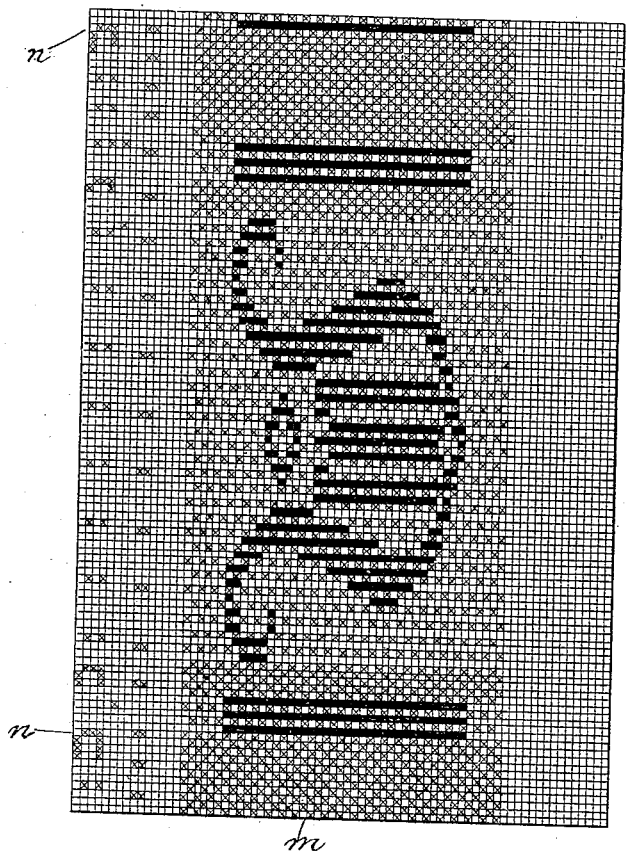

Referring now to the pattern represented in Fig. 17 the mode of operation and the method of using the arrangements described and illustrated will be elucidated first of all in the case of the manufacture of goods having one or two wefts. In Fig. 17 in addition to the pattern proper there are indicated in the first place on the left the perforations $m$ of the ground card which bring about the actuation of the auxiliary apparatus and in proximity to the said perforations are those ($n$) of the small cards of the auxiliary apparatus. In order to produce the design illustrated by Fig. 17 101 cards would be requisite if the hitherto customary contrivances were employed, of which 37 would be apportioned to the figure and 64 to the ground.

By using the present improvements it is necessary to produce only the 37 cards for the figure and in addition 4 ground cards as the ground-cards repeat themselves after each second pick, said 4 ground cards corresponding to the four sides of the ground card-cylinder, so that consequently 60 cards are saved. In this case the last but one ground card, that is, the third ground card in the present example, receives each time two holes, so that the above-mentioned heddles of the main machine are actuated, which as described effect on the one hand the turning of the card-cylinder 85 of the auxiliary apparatus whereby a new card is placed opposite the needles 86, and on the other hand the turning of the double cams 97, 98, 99 whereby they are brought into their vertical position, so that the three first lifting-hooks fall forwards and come within range of the lifting-blade (Fig. 11).

If now the whole ground is to be repeated once more as is indicated by the pattern drawn in Fig. 17 the small card in the operative position on the cylinder 85 is provided with a hole $n$ opposite the needle of the second lifting-hook 103 so that the latter is raised, the result of which as already described is that the double-cams 97, 98, 99 are turned, so that the latter are again placed horizontally and therefore the auxiliary apparatus is again brought back into its initial position. This happens as often as the ground is intended to completely repeat itself (Fig. 13).

In the case of the design drawn, after the eleventh pick the ground card is intended to be switched out of action and the figure card set in operation, that is before the completion of the third ground. In order to obtain this action, the small card placed in the operative position on the cylinder 85 at the seventh pick is perforated not at the part opposite the second lifting-hook 103 but at $m$ opposite the first lifting-hook 102, so that the latter is raised and so the prism 85 is turned further by means of the lever 92, 93 and cord 91, while the double cams 97, 98, 99 remain in their vertical position. This is now repeated, that is, new but always similar cards are brought into the operative positions on the cylinder 85 until it is desired to change over (Fig. 14). In the case of the last ground pick the card in the operative position on the cylinder of the auxiliary apparatus is provided with holes at the parts opposite the second and third lifting-hooks 103 and 104, so that the cams 97, 98, 99 are turned again into a horizontal position by the lifting-hook 103, while the lifting-hook 104 however, by acting on the angle-levers 126, 129 changes over the change-box and the main machine so that now the figure card and the figure shuttles operate (Fig. 15). The figure card having taken over now the work of control, and at the time when the ground card is to work again it changes over the gear by actuating the lifting-hook which acts on the cord 46 passing over the roller 45 and, as Fig. 16 shows, simultaneously on the change-box.

For varying the pattern as desired the mechanism may be arranged at will either so that ground and figure cards act alternately or so that several ground cards act between two of the figure cards. In the former case the cam corresponding to the lifting hook 115 is set vertically by means of the figure card as above described, so that said hook can fall forward. Each of these cards on the auxiliary apparatus being provided with a hole $n$ opposite this lifting hook, the latter remains raised and causes a change at each pick, so that the ground and figure shuttles alternate in their action. If however, the ground card is to operate again several times one after the other, by means of the last figure card the cam 100 of the fourth lifting-hook 115 is again turned into its horizontal position, so that it can no longer operate. Hereupon there then recommences the previously described mode of operation. When manufacturing goods having a single weft, the lever-cords acting on the change-box are of course put out of action.

If the invention is to be applied to the production of fabrics having three or more wefts, there are two cases which must be distinguished, namely, in the first place the case when after the ground pick always the same figure shuttle is to work and in the second place the case when after the ground pick first the one and then the other figure shuttle is to follow. In the first case the change device which serves for setting the figure shuttle, which is always to work after the ground shuttle is connected with the lifting-hook 115 and moreover the lever 120 effecting the turning of the cam 100 of the fourth lifting-hook 115 is formed as a two-arm lever and the second arm of the same is connected with the lifting-hook 115, as is indicated in Fig. 16 in dotted lines, so that the lifting-hook on being raised always turns the cam 100 again and sets it horizontally. Otherwise the arrangement remains as above described. The ground cards act also in this case in the manner mentioned above, that is they set the auxiliary apparatus in action and this effects through the instrumentality of the third lifting-hook 104 the changing-over of the gear of the main machine, so that the figure chain comes into action and the change-box is set so that the figure shuttle, which is intended to work always after the ground shuttle, arrives at the level of the shed. If now several figure cards work one after the other, they bring about as hereinbefore stated the placing of the figure shuttles desired at the time. If again a ground pick is to follow a figure pick the last figure card places the ground card in position and at the same time as hereinbefore stated turns the cam 100 of the fourth lifting-hook 115 into a vertical position so that said lifting-hook, for the needle of which also in this case there is always a hole provided in the card, on the ground pick being inserted is raised, whereby the changing over of the main-machine is effected and the change device actuated so that the figure card is again brought into operation. At the same time however the lifting-hook 115 as already mentioned above on being raised again turns the cam into a horizontal position and so renders itself inoperative. In the second case when on the figure card being in action first the one and then the other figure shuttle is to be set in position, instead of the hitherto described four lifting-hooks as many lifting-hooks must be arranged as there are figure shuttles. For each lifting-hook a double cam must be provided, which independently of one another and each by means of a separate controlling-gear can be set in a perpendicular position by a heddle on the main machine, each lifting-hook being so connected with the controlling gear of its cam in the manner described above that on being raised it always turns its cam into a horizontal position again, that is, renders itself inoperative. The lifting-hooks are in that case all connected with the lever-mechanism actuating the change-over gear of the main machine and moreover each is connected with a lever-mechanism acting on the change-box so that when the first lifting-hook is raised the first, and when two adjacent lifting-hooks are raised the second and when three lifting-hooks are raised the third figure shuttle is placed in position.

On passing over from the figure to the ground the last figure card places all of the cams of the last mentioned lifting-hooks vertically, so that the latter can act, if their needles are not pressed back by the card on the apparatus cylinder 85 which card was placed in the operative position with the last figure card. As long as the ground card works the mode of operation is exactly the same as in the case of goods having one and two wefts. If now after a certain ground card a change-over is to occur, that is the figure-card and one of the figure shuttles is to work, the mode of procedure is at first likewise again the same as that described above with reference to goods having one and two wefts, that is, the auxiliary apparatus is set in action by the ground card-chain, and as many cards are then allowed to be worked off as come into operation before the ground-card is reached. The last of the small cards carried in this case on the cylinder of the auxiliary apparatus is provided with holes at the places corresponding to the lifting-hooks acting on the change-box, which lifting-hooks on being raised set the desired figure shuttles in position. This raising action is brought about during the next pick and the main machine is thereby changed over, so that the figure card-cylinder comes into action and as already stated the desired figure shuttle is set in position. The first figure card has the effect of placing a new card in the operative position on the prism of the auxiliary apparatus, which new card is perforated at those places which correspond with the lifting-hooks of the apparatus which act on the change-box, and the figure-cards then bring about the adjustment of the position of the cams, belonging to these lifting-hooks, so that first the one and then several of these lifting-hooks are raised and consequently according to the design now the first and then the second figure shuttle and so on are brought into operation, a ground pick being always able to be inserted alternately with the figure pick. If now during several picks the ground card chain is to work again, a new card is placed by the last figure card in the operative position on the cylinder of the auxiliary apparatus, which new card is not perforated at the places corresponding to the lifting-wires acting on the change-box and simultaneously the double cams belonging to the lifting wires are again turned into a vertical position so that the described action can commence afresh.

If a fairly large number of figure shuttles are present in order to simplify the arrangement, instead of connecting all lifting-hooks corresponding to the shuttles also with the change-over gear of the main machine, a special lifting-hook is arranged for actuating this change-over gear, which lifting-hook always coöperates with the lifting-hooks effecting the change of shuttles.

Finally it may be mentioned that the auxiliary apparatus may be accommodated in a position other than that occupied in the example drawn. For example, the auxiliary apparatus might be built on the main machine or in the latter, in which case the lifting-blade of the auxiliary apparatus could be connected directly with the griff of the main machine, so that it would have to follow said griff in its motion. In this case the rod-mechanism provided for the said lifting-blade in the form illustrated by way of example would be saved.

Having now explained the nature of my invention I declare that what I claim and desire to secure by Letters Patent is:

1. In combination with two jacquard card cylinders and two independent series of needles respectively operated thereby, lifting hooks adapted to be controlled by the cards of either one of said cylinders, cams respectively operated by said hooks, devices actuated by said cams for holding one card cylinder or the other temporarily out of action and means for automatically freeing each cylinder so held and shuttle box change mechanism also operated by said hooks substantially as set forth.

2. In combination with two jacquard cylinders and two independent series of needles respectively operated thereby, lifting hooks adapted to be controlled by the cards of either one of said cylinders cams respectively operated by said hooks, devices for locking either one of said cylinders at will and cam actuated means operatively connected with said devices for freeing either one of said cylinders thus locked, such means including in each instance a resilient member for moving the corresponding locking device to free the locked cylinder without a jar shuttle box change mechanism also operated by said hooks substantially as set forth.

3. In combination with two jacquard cylinders and two independent series of needles respectively operated thereby, lifting hooks adapted to be controlled by the cards of either one of said cylinders, cams respectively operated by said hooks, bars for locking either one of said cylinders a pair of resilient levers operated by said cams and connected respectively to said bars to withdraw either one of them without jar thereby freeing the locked cylinder and shuttle box change mechanism also operated by said hooks and mechanism for operating the said levers substantially as set forth.

4. In combination with lifting hooks and a pair of card cylinders, either one of which may operate at will any one of said hooks, movable means for locking said cylinders, a rocking shaft and cams carried thereby for actuating such means, a pivoted pawl and ratchet for operating said shaft, mechanism for actuating said pawl to give a step by step motion to said ratchet and means for normally holding said pawl out of action substantially as set forth.

5. An auxiliary card cylinder and mechanism for turning the same, in combination with locking devices normally holding such mechanism out of action, the heddle of the main jacquard machine arranged to actuate such mechanism and intermediate means for freeing such locking devices and allowing such cylinder turning mechanism to operate substantially as set forth.

6. An auxiliary cylinder and mechanism for turning the same, in combination with a reciprocating lifting blade, a series of lifting hooks, means for normally holding the first three of said hooks out of the path of said blade, controlling mechanism for such means, a heddle of the main jacquard machine arranged to actuate such mechanism, the card cylinder and loom mechanism of the main jacquard machine and shuttle changing devices of the said main machine connected to one of said three lifting hooks, another of these lifting hooks being arranged to act on said controlling mechanism, the foregoing parts being arranged and adapted to permit the auxiliary devices to be actuated from the main machine, by raising one of said first three lifting hooks or put out of action by raising another of said hooks and to effect the substitution of one card-cylinder and batten for the other in operation by raising the third of said hooks substantially as set forth.

7. A pair of card cylinders for a jacquard machine in combination with vibrating battens and noses and lifting blades movably arranged on said battens, catches normally holding said noses in operative position, triggers for freeing said catches, rotary shafts for operating said triggers, spring-pressed parts acting on said shafts and interposed between them and the said battens, the said parts and triggers being relatively arranged and adapted to free all the catches in case both battens move forward together or only one set of catches in case the other batten moves forward alone substantially as set forth.

8. In combination with a vibrating batten, a holder fastened thereto, an arm pivoted to said holder, a nose carried by said arm, a slide-piece mounted in a guide on said holder, a catch mounted on said holder engaging and locking said slide-piece and mechanism for automatically acting on said catch to free said slide-piece and nose.

In testimony whereof, I have signed my name to this specification in the presence of two subscribing witnesses.

ALEXANDER AMBRUS.

Witnesses:
OTTO KÖNIG,
EWALD ENGELHARDT.